United States Patent
Nakamura et al.

(10) Patent No.: US 12,064,843 B2
(45) Date of Patent: Aug. 20, 2024

(54) MOTOR CONTROL DEVICE AND INDUSTRIAL MACHINE FOR SUPPRESSING VIBRATION

(71) Applicant: Fanuc Corporation, Yamanashi (JP)

(72) Inventors: Tsutomu Nakamura, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 521 days.

(21) Appl. No.: 16/884,483

(22) Filed: May 27, 2020

(65) Prior Publication Data

US 2020/0376620 A1 Dec. 3, 2020

(30) Foreign Application Priority Data

Jun. 3, 2019 (JP) .................. 2019-103733

(51) Int. Cl.
B23Q 17/12 (2006.01)
B23Q 5/10 (2006.01)
(Continued)

(52) U.S. Cl.
CPC .............. B23Q 17/12 (2013.01); B23Q 5/10 (2013.01); B23Q 11/0039 (2013.01); B23Q 17/0961 (2013.01)

(58) Field of Classification Search
CPC ............ B23Q 11/0039; B23Q 17/0961; B23Q 17/12; B23Q 5/10; G05B 19/404;
(Continued)

(56) References Cited

U.S. PATENT DOCUMENTS

| 5,229,896 A | 7/1993 | Tohyama et al. |
| 9,772,619 B2 | 9/2017 | Shinohara et al. |

(Continued)

FOREIGN PATENT DOCUMENTS

| JP | 60207908 A | 10/1985 |
| JP | 63189911 A | 8/1988 |

(Continued)

OTHER PUBLICATIONS

Desai, Prafulchandra Pragjibhai, "Design of a torsional vibration machine" (1972). Masters Theses. 5112 (Year: 1972).*

(Continued)

*Primary Examiner* — Kyle R Quigley
(74) *Attorney, Agent, or Firm* — Buchanan Ingersoll & Rooney PC

(57) ABSTRACT

A motor control device includes: a position command section configured to generate a position command for a control object; a position detecting section configured to detect a position of the control object or a position of a motor configured to drive the control object; and a position control section configured to control a position of the motor based on the position command and the detected position of the control object or the motor, in which at least one of the position command section and the position control section includes a vibration suppression filter configured to approximate a reverse characteristic of a vibration characteristic generated between the motor and the control object, and the vibration suppression filter changes a vibration suppression frequency according to at least one of the position and a mass of the control object.

10 Claims, 6 Drawing Sheets

(51) Int. Cl.
*B23Q 11/00* (2006.01)
*B23Q 17/09* (2006.01)

(58) Field of Classification Search
CPC ........... G05B 2219/41122; G05B 2219/41166;
G05B 2219/41233; G05B 2219/41427;
G05B 2219/42054; G05B 5/01
See application file for complete search history.

(56) References Cited

U.S. PATENT DOCUMENTS

| | | | |
|---|---|---|---|
| 10,481,580 | B2 | 11/2019 | Nagaoka |
| 10,754,305 | B2 | 8/2020 | Iwase |
| 2004/0100219 | A1* | 5/2004 | Kerner .................... G01M 1/10 |
| | | | 318/648 |
| 2013/0006586 | A1* | 1/2013 | Savant .................... G06F 30/17 |
| | | | 703/1 |
| 2013/0234642 | A1* | 9/2013 | Igarashi .............. H02P 23/0004 |
| | | | 318/611 |

FOREIGN PATENT DOCUMENTS

| | | |
|---|---|---|
| JP | 04038504 A | 2/1992 |
| JP | 04159669 A | 6/1992 |
| JP | 2006190163 A | 7/2006 |
| JP | 2009015448 A | 1/2009 |
| JP | 2016163397 A | 9/2016 |
| JP | 2019009858 A | 1/2019 |
| WO | 2015104736 A1 | 7/2015 |
| WO | 2015111298 A1 | 7/2015 |
| WO | 2018029910 A1 | 2/2018 |

OTHER PUBLICATIONS

Brainkart, Spring Deflection and Wahls factor, brainkart.com, Oct. 28, 2018 (Year: 2018).*
Edge, Torsional Deflection of Shaft, engineersedge.com, Feb. 3, 2017 (Year: 2017).*
MATHalino, Torsion, Engineering Mathmematics, mathalino.com, Aug. 19, 2018 (Year: 2018).*
Shigley, Mechanical Engineering Design 9th, McGraw Hill, pp. 67, 520, 2011 (Year: 2011).*

* cited by examiner

MOTOR CONTROL DEVICE AND INDUSTRIAL MACHINE FOR SUPPRESSING VIBRATION

CROSS-REFERENCE TO RELATED APPLICATIONS

This application is a new U.S. Patent Application that claims benefit of Japanese Patent Application No. 2019-103733, dated Jun. 3, 2019, the disclosure of this application is being incorporated herein by reference in its entirety for all purposes.

BACKGROUND OF THE INVENTION

1. Field of the Invention

The present invention relates to a motor control device and an industrial machine, and more particularly to a motor control device and an industrial machine for suppressing vibration.

2. Description of the Related Art

When a workpiece is machined using a machine tool that generates low frequency vibration, for example, vibration in a frequency band of 100 Hz or less, it has been a problem that stripes are formed on the workpiece in response to the vibration. The following documents are known as techniques for suppressing such low frequency vibrations.

JP 2009-15448 A discloses a motor control device of a semi-closed control system for performing feedback control of a position and speed of a motor, which includes a band stop filter that detects the natural frequency of the control object and removes components of the detected natural frequency.

JP 2016-163397 A discloses a motor control device of a fully-closed control system for performing feedback control of a position of a machine, in which a position control section is provided with a filter for approximating a reverse characteristic of a transfer characteristic from a motor to the machine.

JP 2019-9958 A discloses a motor control device of a semi-closed control system for performing feedback control of a speed of a motor, in which a speed control section is provided with a filter for approximating a reverse characteristic of a transfer characteristic from the motor to a machine.

SUMMARY OF THE INVENTION

In the method of removing only a specific vibration component by detecting a natural frequency of a machine, a change of the vibration suppression function with respect to a change of the vibration characteristic is likely to be delayed, and the component other than the target vibration component is also likely to be removed, so that the motor control may become unstable.

Therefore, there is a need for a technique for more quickly and more accurately adapting a vibration suppression function to a change in a vibration characteristic.

One aspect of the present disclosure provides a motor control device including: a position command section configured to generate a position command for a control object; a position detecting section configured to detect a position of the control object or a position of a motor configured to drive the control object; and a position control section configured to control a position of the motor based on the generated position command and the detected position of the control object or the position of the motor, in which at least one of the position command section and the position control section includes a vibration suppression filter configured to approximate a reverse characteristic of a vibration characteristic generated between the motor and the control object, and the vibration suppression filter changes a vibration suppression frequency according to at least one of the position and a mass of the control object.

Another aspect of the present disclosure provides an industrial machine including a motor, an own shaft driven by the motor, a control object movable by the own shaft, and the motor control device described above.

Another aspect of the present disclosure provides an industrial machine including a motor, an own shaft driven by the motor, another shaft driven by a motor different from the motor, a control object movable by at least one of the own shaft and the other shaft, and the motor control device described above.

DETAILED DESCRIPTION

Figure 1:
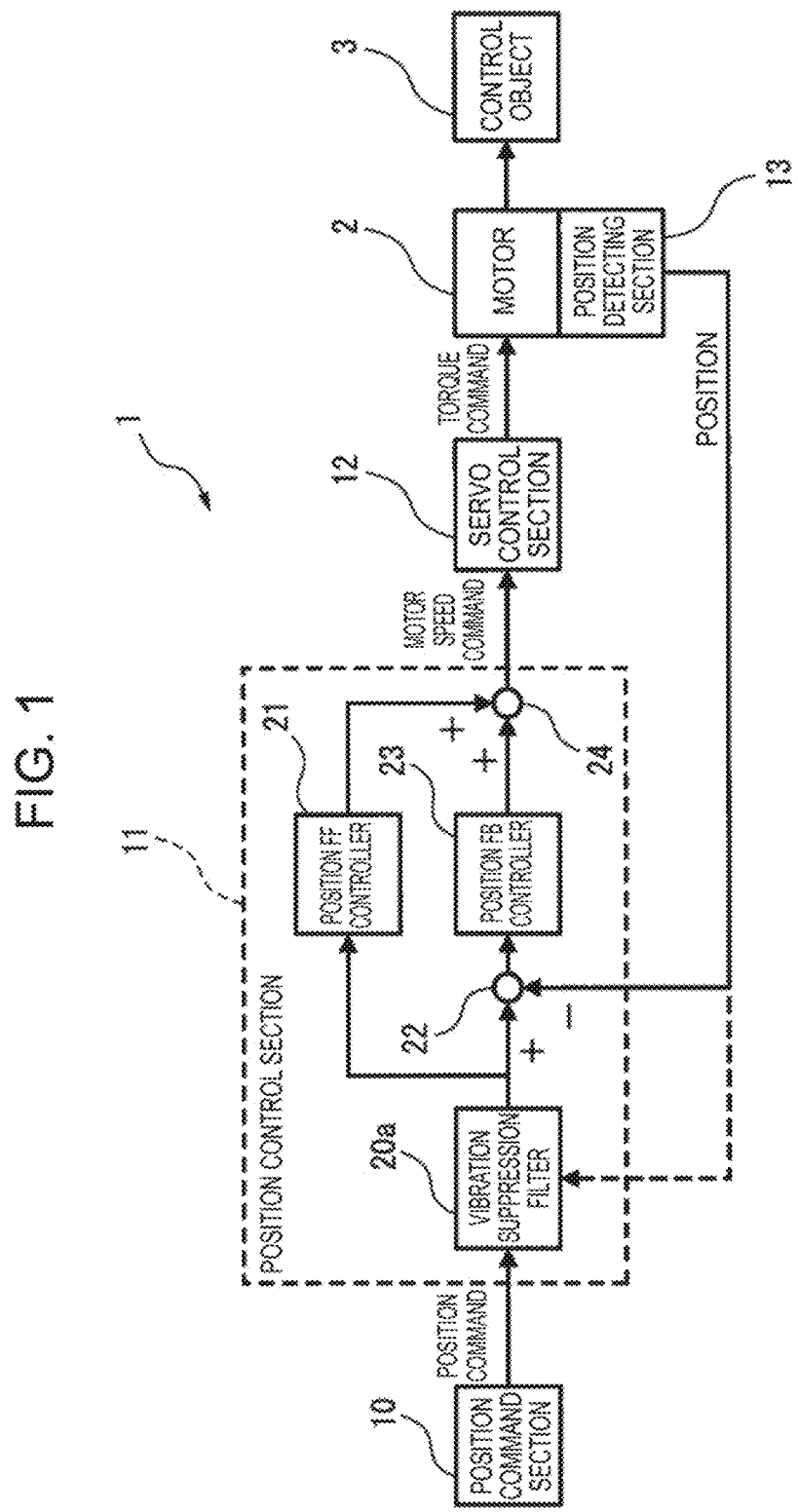
FIG. 1 is a configuration diagram of a motor control device of a semi-closed control system according to one embodiment.

Embodiments of the present disclosure will be described in detail below with reference to the accompanying drawings. In each drawing, the same or similar components are denoted by the same or similar reference numerals. Additionally, the embodiments described below are not intended to limit the technical scope of the invention or the meaning of terms set forth in the claims. Note that "feedforward" is referred to herein as "FF" and "feedback" is referred to as "FB".

FIG. 1 illustrates a configuration of a motor control device 1 of a semi-closed control system. The motor control device 1 includes a position command section 10 that generates a position command for the control object 3, a position control section 11 that controls a position of a motor 2 based on the generated position command and the detected position of the motor 2, and a position detecting section 13 directly attached to the motor. The position detecting section 13 includes a rotational displacement sensor such as an encoder, a resolver, and a Hall sensor. A control object 3 includes, for example, a table, a main spindle head, a conveyor or the like of an industrial machine such as a machine tool and a transport machine.

The motor control device 1 may further include a servo control section 12 that performs speed control and torque control. However, the position control section 11 may also have the function of the servo control section 12. In the latter case, the position control section 11 may directly output the torque command to the motor 2. In addition, the position command section 10, the position control section 11, and the servo control section 12 may include a processor such as a central processing unit (CPU) and a field-programmable gate array (FPGA). The position control section 11 includes a vibration suppression filter 20a, a position FF controller 21, a subtractor 22, a position FB controller 23, and an adder 24.

The vibration suppression filter 20a is provided with a filter that approximates a reverse characteristic of a vibration characteristic generated between the motor 2 and the control object 3. Since the motor control device 1 is a semi-closed control system, the vibration suppression filter 20a compensates for a vibration characteristic that occurs outside the position FB loop (i.e., between the motor 2 and the control object 3). Thus, the vibration suppression filter 20a may be a position command filter that is provided outside the position FB loop and corrects the position command. Furthermore, the vibration suppression filter 20a may be provided in the position command section 10, rather than provided in the position control section 11.

The position FF controller 21 differentiates the position command to generate a first speed command. The subtractor 22 subtracts the detected motor position from the position command to generate a position deviation. The position FB controller 23 multiplies the position deviation by the position FB gain to generate a second speed command. The adder 24 adds the first speed command and the second speed command to generate a motor speed command.

Figure 2:
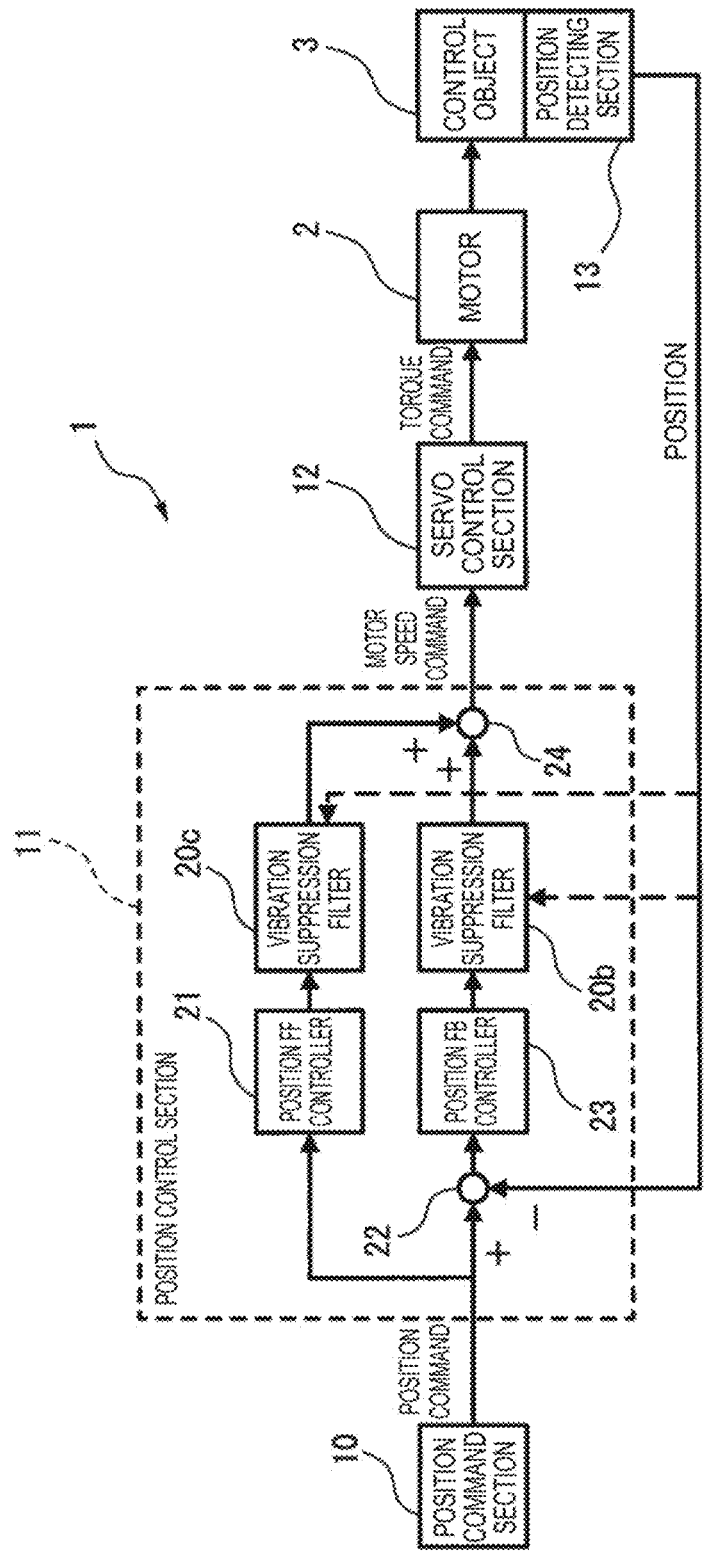
FIG. 2 is a configuration diagram of a motor control device of a fully-closed control system according to one embodiment.

FIG. 2 illustrates a configuration of a motor control device 1 of a fully-closed control system. The motor control device 1 differs from the one described above in that the motor control device 1 includes a position detecting section 13 attached to an industrial machine. The position detecting section 13 includes a linear displacement sensor such as a strain gauge, and a laser displacement sensor. The position control section 11 controls the position of the motor 2 based on the position command generated by the position command section 10, and based on the detected position of the control object 3.

Since the motor control device 1 is a fully-closed control system, a vibration suppression filter 20b compensates for a vibration characteristic that occurs inside the position FB loop (specifically between the motor 2 and the control object 3). Thus, the vibration suppression filter 20b may be a position FB filter provided inside the position FB loop. The vibration suppression filter 20b may be a second speed command filter, which is provided downstream from the position FB controller 23 and corrects the second speed command, but may be a motor speed command filter, which is provided immediately after the adder 24 and corrects the motor speed command. Furthermore, the vibration suppression filter 20b may be a position deviation filter, which is provided upstream from the position FB controller 23 and corrects the position deviation.

In addition to or instead of the vibration suppression filter 20b, the position control section 11 may include a vibration suppression filter 20c outside the position FB loop. The vibration suppression filter 20c may be a position FF filter provided outside the position FB loop. The vibration suppression filter 20c may be a first speed command filter, which is provided downstream from the position FF controller 21 and corrects the first speed command, but may be a position command filter, which is provided upstream from the position FF controller 21 and corrects the position command. By providing the vibration suppression filter 20c outside the position FB loop, the frequency component for generating vibration in the 1st speed command can be reduced, and the control object can be moved without vibration.

The vibration suppression filters 20a to 20c described above are each provided with a filter F (s) that approximates a reverse characteristic (equation 2) of a vibration characteristic (equation 1) generated between the motor 2 and the control object 3. In these equations, $\omega_0$ is an anti-resonance frequency (i.e., a vibration suppression frequency), $\zeta$ is a vibration damping coefficient, and s is a Laplacian operator.

$$\frac{2\zeta\omega_0 s + \omega_0^2}{s^2 + 2\zeta\omega_0 s + \omega_0^2} \qquad \text{Equation 1}$$

$$F(s) = \frac{s^2 + 2\zeta\omega_0 s + \omega_0^2}{2\zeta\omega_0 s + \omega_0^2} \qquad \text{Equation 2}$$

In the vibration suppression filter F (s) illustrated in equation 2, the numerator polynomial is important, and the denominator polynomial may be an appropriate low-pass filter. The low-pass filter can include a primary low-pass filter, a secondary low-pass filter, or the like. The primary low-pass filter is an ideal type, and can be described, for example, by the following equation. In the following equation, $\omega_{adj}$ is an adjustable parameter for a specific anti-resonance frequency.

$$F(s) = \frac{s^2 + 2\zeta\omega_0 s + \omega_0^2}{(2\zeta s + \omega_0)(s + \omega_{adj})} \cdot \frac{\omega_{adj}}{\omega_0} \qquad \text{Equation 3}$$

The secondary low-pass filter is a mounting type and can be described, for example, by the following equation. The secondary low-pass filter is suitable for suppressing only targeted vibration components.

$$F(s) = \frac{s^2 + 2\zeta\omega_0 s + \omega_0^2}{s^2 + 2\zeta\omega_{adj} s + \omega_{adj}^2} \cdot \frac{\omega_{adj}^2}{\omega_0^2} \qquad \text{Equation 4}$$

The anti-resonance frequency $\omega_0$ (i.e., the vibration suppression frequency) in these vibration suppression filters F (s) changes in accordance with a physical change of the control object 3 (i.e., a change in at least one of the position and the mass). Accordingly, in the vibration suppression filters 20a to 20c of the present example, the vibration suppression frequency is changed in accordance with at least one of the position and the mass of the control object 3, as described below.

In general, an industrial machine transmits power to the control object 3 via a power transmission element such as a shaft, a gear, a belt, a chain, a cam, and a link. Accordingly, the vibration frequency of the control object 3 can be described by the torsional vibration characteristic, the plate spring vibration characteristic, of the power transmission element, and combinations thereof, or the like.

Figure 3A:
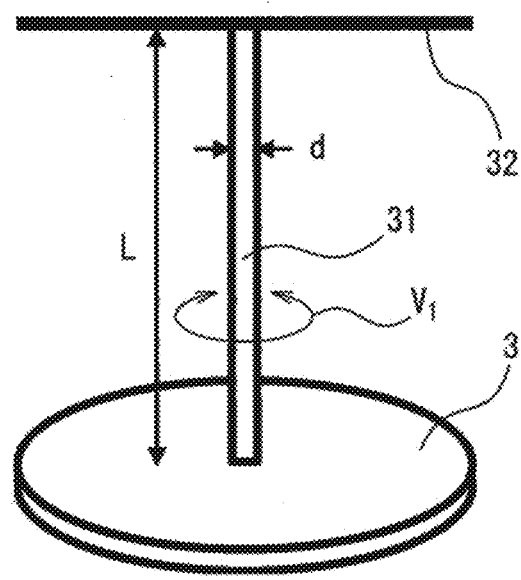
FIG. 3A is an explanatory diagram illustrating a torsional vibration characteristic of a ball screw.
Figure 3B:
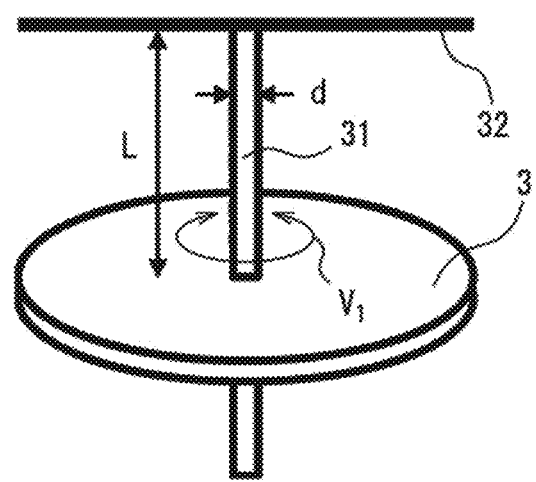
FIG. 3B is an explanatory diagram illustrating a torsional vibration characteristic of a ball screw.

As an example of the torsional vibration characteristic, the torsional vibration characteristic of a ball screw 31 will be described with reference to FIGS. 3A and 3B. In this example, it is assumed that the control object 3 as a table moves on the ball screw 31, the ball screw 31 is supported by a support element 32 in a cantilever manner, and the ball screw 31 generates a torsional vibration $V_1$. When the ball screw 31 has a length L, a diameter d, and a transverse elastic modulus G, and its mass can be ignored, the spring constant $k_1$ of the ball screw 31 is represented by the equation below:

$$k_1 = \frac{\pi d^4 G}{32L} \quad \text{Equation 5}$$

As can be seen from this equation, the spring constant $k_1$ changes depending on the length L, of the ball screw, equivalent to the position of the control object 3. As the position of the control object 3 changes as illustrated in FIG. 3B and the spring constant $k_1$ changes, the angular frequency $\omega_1$ (i.e., the vibration frequency) of the control object 3 also changes as in the following equation. In the following equation, $J_L$ is an inertia of the control object 3.

$$\omega_1 = \sqrt{k_1/J_L} \quad \text{Equation 6}$$

According to this equation, it is also understood that the angular frequency $\omega_1$ of the control object 3 changes according to the inertia $J_L$ equivalent to a mass M of the control object 3. When the control object 3 has the mass M and is driven by the ball screw 31 with the pitch p [m], the inertia $J_L$ of the control object 3 can be converted into the mass M of the control object 3 by the following equation.

$$J_L = \left(\frac{p}{2\pi}\right)^2 \times M \quad \text{Equation 7}$$

Figure 4:
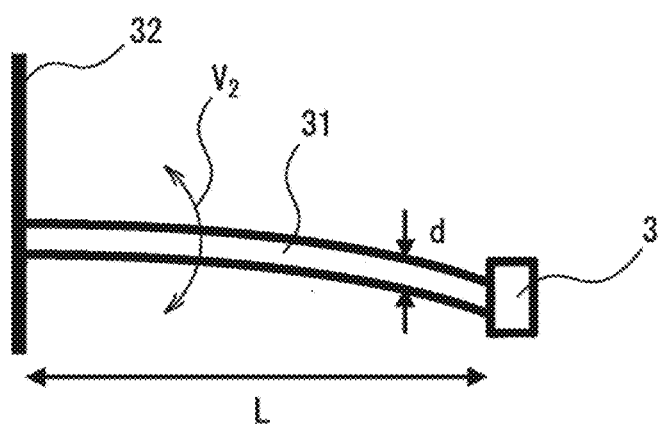
FIG. 4 is an explanatory diagram illustrating a plate spring vibration characteristic of a ball screw.

Further, as an example of the plate spring vibration characteristic, the plate spring vibration characteristic of the ball screw 31 will be described with reference to FIG. 4. In this example, it is assumed that the control object 3 is at the tip of the ball screw 31, the ball screw 31 is supported by the support element 32 in a cantilever manner, and the ball screw 31 generates a plate spring vibration $V_2$. When the ball screw 31 has a length L, a diameter d, and a Young's modulus E, and its mass can be ignored, a spring constant $k_2$ of the ball screw 31 is represented by the equation below:

$$k_2 = \frac{d^4 E}{4L^3} \quad \text{Equation 8}$$

As can be seen from this equation, the spring constant $k_2$ changes depending on the length L, of the ball screw 31, equivalent to the position of the control object 3. As the position of the control object 3 changes and the spring constant $k_2$ changes, the angular frequency $\omega_2$ (i.e., the vibration frequency) of the control object 3 also changes as in the following equation: In the following equation, M is the mass of the control object 3.

$$\omega_2 = \sqrt{k_2/M} \quad \text{Equation 9}$$

According to this equation, it is also understood that the angular frequency $\omega_2$ of the control object 3 changes according to the mass M of the control object 3.

Referring again to FIG. 1 and FIG. 2, the position of the control object 3 (i.e., the ball screw length L) may be input from the position detecting section 13 to the vibration suppression filters 20a to 20c as indicated by the dashed arrow, or may be input from the position command section 10 to the vibration suppression filters 20a to 20c. On the other hand, the mass M of the control object 3 may be input in advance to the motor control device 1 by an operator, or may be estimated from the relationship between a torque and an acceleration of the control object 3 or the motor 2 by operating (e.g., vibrating) the motor 2 minutely.

Figure 5:
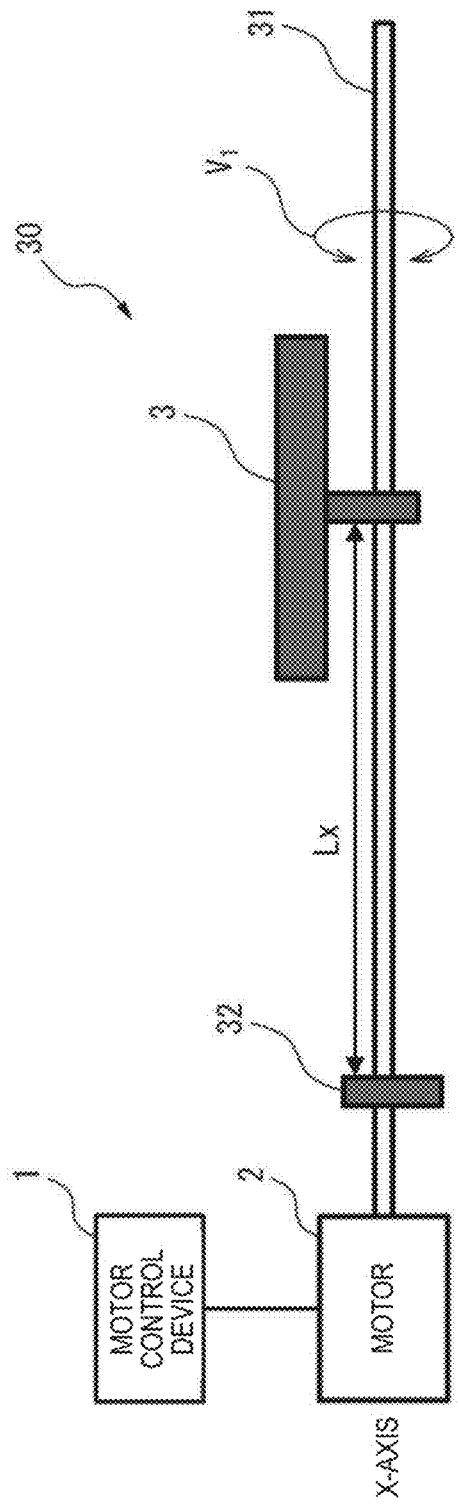
FIG. 5 is a configuration diagram of an industrial machine with its own shaft driven by a motor.

FIG. 5 illustrates an industrial machine 30 provided with its own shaft 31 driven by the motor 2. The industrial machine 30 includes the motor 2, the own shaft 31 driven by the motor 2, the control object 3 movable by the own shaft 31, and the motor control device 1 that controls the motor 2. The motor 2 is, for example, a servo motor, the own shaft 31 is, for example, an X-axis ball screw that defines the X-axis direction, and the control object 3 is, for example, a table. The own shaft 31 is supported by the support element 32 in a cantilever manner, but may be supported by both ends.

The motor control device 1 includes the vibration suppression filters 20a to 20c illustrated in FIG. 1 or FIG. 2 according to the fully-closed control system or the semi-closed control system. The own shaft 31 generates a torsional vibration $V_1$, and the torsional vibration characteristic changes according to a position Lx of the control object 3 in the X-axis direction. Therefore, the vibration suppression filters 20a to 20c obtain the angular frequency $\omega_1$ of the torsional vibration $V_1$ from the equation 6 based on the position Lx of the control object 3 on the own shaft 31, and changes the vibration suppression frequency $\omega_0$ of F (s) approximating the reverse characteristic of the torsional vibration characteristic based on the obtained angular frequency $\omega_1$. Then, the vibration suppression filters 20a to 20c output the changed F (s).

Figure 6:
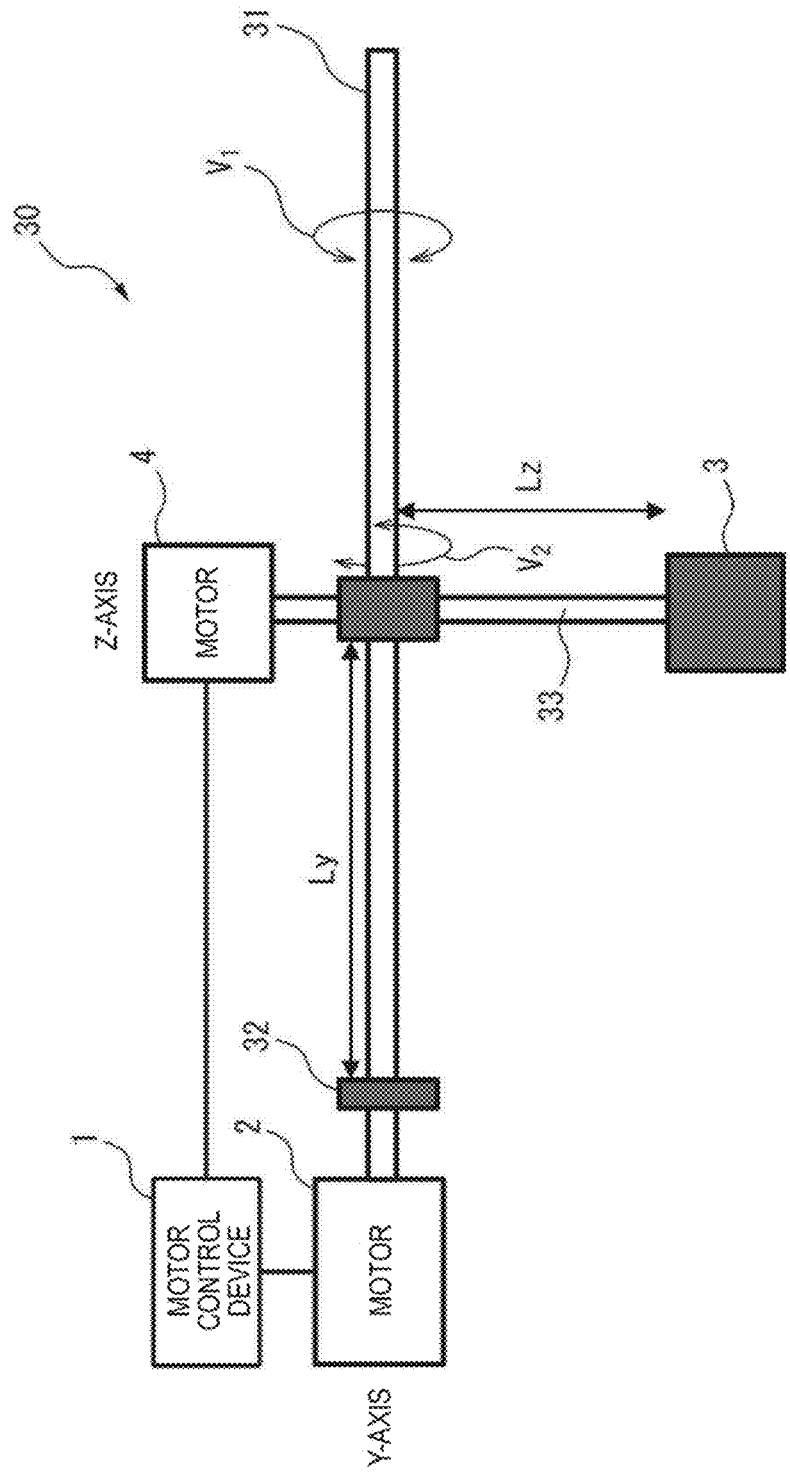
FIG. 6 is a configuration diagram of an industrial machine with another shaft driven by a motor different from the aforementioned motor.

FIG. 6 illustrates an industrial machine 30 also provided with another shaft 33 driven by a motor 4 different from the motor 2. The industrial machine 30 includes a motor 2, an own shaft 31, another shaft 33, a control object 3 movable by at least one of the own shaft 31 and the other shaft 33, and a motor control device 1 that controls the motor 2 and the motor 4. The own shaft 31 is, for example, a Y-axis ball screw that defines the Y-axis direction, the other shaft 33 is, for example, a Z-axis ball screw that defines the Z-axis direction, and the control object 3 is, for example, a main spindle head. The own shaft 31 is supported in a cantilever manner by the support element 32, but may be supported by both ends, and the other shaft 33 is supported in a cantilever manner.

The motor control device 1 includes the vibration suppression filters 20a to 20c illustrated in FIG. 1 or FIG. 2 according to the fully-closed control system or the semi-closed control system. The own shaft 31 generates a torsional vibration $V_1$, and the torsional vibration characteristic changes according to a position Ly of the control object 3 in the Y-axis direction. The other shaft 33 generates a plate spring vibration $V_2$, and the plate spring vibration characteristic changes according to a position Lz of the control object 3 in the Z-axis direction. The vibration suppression filters 20a to 20c obtain the angular frequency $\omega_1$ of the torsional vibration $V_1$ from equation 6 in accordance with the position Ly of the control object 3 on the own shaft 31, and change the vibration suppression frequency $\omega_0$ of $F_1$ (s) approximating the reverse characteristic of the torsional vibration characteristic based on the obtained angular frequency $\omega_1$. Moreover, the vibration suppression filters 20a to 20c obtain the angular frequency $\omega_2$ of the plate spring vibration $V_2$ from equation 9 according to the position Lz of the control object 3 on the other shaft 33, and change the vibration suppression frequency ω₀ of $F_2$ (s) approximating the reverse characteristic of the plate spring vibration characteristic based on the obtained angular frequency ω₂. Then, the vibration suppression filters 20a to 20c output $F_1$ (s)× $F_2$ (s) after the change.

According to the above-described embodiment, the vibration suppression filters 20a to 20c are changed in accordance with the physical change of the control object 3 (i.e., change in at least one of the position and the mass of the control object), so that the vibration suppression filter 20a to 20c can be adapted to a change in the vibration characteristic more quickly and more accurately.

Further, the program executed by the above-described processor may be provided by being recorded on a non-transitory recording medium readable by a computer, such as a CD-ROM.

Although various embodiments have been described herein, it should be recognized that the present invention is not limited to the above-described embodiments and various changes can be made within the scope described in the following claims.

The invention claimed is:

1. A motor control device comprising:
a position command section configured to generate a position command for a control object driven along a first of a plurality of shafts, wherein the first shaft is supported on at least one end by a supporting element;
a position detecting section configured to detect a position of the control object along the plurality of shafts or a position of at least one motor configured to drive the control object; and
a position control section configured to control a position of the at least one motor based on the generated position command and the detected position of the control object or the position of the at least one motor,
wherein the position control section includes a vibration suppression filter configured to approximate a reverse characteristic of a vibration characteristic generated between the motor and the control object in accordance with a physical change in at least one of a position and mass of the control object, and wherein the vibration suppression filter changes an output of a vibration suppression frequency to correspond to the approximated reverse characteristic based on:
a torsional vibration characteristic of the first shaft computed based on a first elasticity of the first shaft and the position of the control object relative to the supporting element, and an inertia of the control object on the first shaft, wherein the first elasticity is a transverse elastic modulus, and
a spring plate vibration characteristic of a second shaft of the plurality of shafts computed based on a second elasticity of the second shaft and a position of the control object on the second shaft, and a mass of the control object, wherein the second elasticity is Young's modulus,
wherein a spring constant $k_1$ of the first shaft is represented by:

$$k_1 = \frac{\pi d^4 G}{32L}, \text{ and}$$

wherein a spring constant $k_2$ of the second shaft is represented by:

$$k_2 = \frac{d^4 E}{4L^3}.$$

2. The motor control device of claim 1, wherein the position of the control object is a position of the control object on the first shaft driven by the motor or a position of the control object on the second shaft driven by a motor different from the at least one motor.

3. The motor control device of claim 1, wherein a weight of the control object is input by an operator in advance, or is estimated based on a relationship between a torque and an acceleration of the control object or the motor.

4. The motor control device of claim 1, wherein the torsional vibration characteristic is represented by the following equation:

$$\omega_1 = \sqrt{k_1/J_L}$$

based on the spring constant $k_1$ including the transverse elastic modulus and configured to change according to the position of the control object, an inertia $J_L$ of the control object, and an angular frequency @₁ of the control object.

5. The motor control device of claim 1, wherein the plate spring vibration characteristic is represented by the following equation:

$$\omega_2 = \sqrt{k_2/M}$$

based on the sring constant $k_2$ including the Young's modulus and configured to change according to the position of the control object, a mass M of the control object, and an angular frequency @₂ of the control object.

6. The motor control device of claim 1, wherein the motor control device is a semi-closed control system, and the vibration suppression filter is a position command filter provided outside a position feedback loop.

7. The motor control device of claim 1, wherein the motor control device is a fully-closed control system, and the vibration suppression filter is a position feedback filter provided inside a position feedback loop.

8. The motor control device of claim 7, wherein the motor control device is a fully-closed control system, and the vibration suppression filter is a position feedforward filter provided outside a position feedback loop.

9. An industrial machine comprising:
a motor;
an own shaft driven by the motor;
a control object movable by the own shaft; and
the motor control device of claim 1.

10. An industrial machine comprising:
a motor;
an own shaft driven by the motor;
another shaft driven by a motor different from the motor;
a control object movable by at least one of the own shaft and the other shaft; and
the motor control device of claim 1.

* * * * *

UNITED STATES PATENT AND TRADEMARK OFFICE
CERTIFICATE OF CORRECTION

| | |
|---|---|
| PATENT NO. | : 12,064,843 B2 |
| APPLICATION NO. | : 16/884483 |
| DATED | : August 20, 2024 |
| INVENTOR(S) | : Tsutomu Nakamura and Satoshi Ikai |

It is certified that error appears in the above-identified patent and that said Letters Patent is hereby corrected as shown below:

In the Claims

In Claim 4, Column 8, Line 26 delete "@1" and insert -- $\omega 1$ --.

In Claim 5, Column 8, Line 33 delete "sring" and insert -- spring --.

In Claim 5, Column 8, Line 36 delete "@2" and insert -- $\omega 2$ --.

Signed and Sealed this
Twenty-sixth Day of November, 2024

Katherine Kelly Vidal
*Director of the United States Patent and Trademark Office*